United States Patent [19]

Praefcke et al.

[11] Patent Number: 4,631,143
[45] Date of Patent: Dec. 23, 1986

[54] TRIPHENYLENE DERIVATIVES

[75] Inventors: Klaus Praefcke; Bernd Kohne; Wadi Poules, all of Berlin; Eike Poetsch, Mühltal, all of Fed. Rep. of Germany

[73] Assignee: Merck Patent Gesellschaft mit beschränkter Haftung, Darmstadt, Fed. Rep. of Germany

[21] Appl. No.: 685,084

[22] Filed: Dec. 21, 1984

[30] Foreign Application Priority Data

Dec. 24, 1983 [DE] Fed. Rep. of Germany ....... 3346980
Jul. 10, 1984 [DE] Fed. Rep. of Germany ....... 3425261

[51] Int. Cl.$^4$ .................... C09K 3/34; C07C 149/30; C07C 149/34; C07C 149/31; C07C 149/415; C07C 147/06; C07C 147/08; C07C 147/14
[52] U.S. Cl. ........................... 252/299.62; 252/299.5; 252/299.6; 252/299.01; 350/350 R; 350/350 S; 558/396; 558/397; 568/28; 568/32; 568/34; 568/36; 568/45; 568/47; 568/49; 568/55; 568/57; 568/58; 568/66; 568/67; 558/257
[58] Field of Search ............ 252/299.5, 299.6, 299.62; 350/350 R, 350 S; 260/455 R, 453 R; 568/28, 32, 34, 36, 45, 47, 49, 55, 57, 58, 66, 67

[56] References Cited

U.S. PATENT DOCUMENTS 4,333,709  6/1982  Dubois et al. .................. 252/299.62
4,430,650  2/1984  Billard et al. .................. 252/299.62
4,578,210  3/1986  Praefcke et al. ................ 252/299.5

FOREIGN PATENT DOCUMENTS 134576   3/1985  European Pat. Off. ......... 252/299.6
149209   7/1985  European Pat. Off. ....... 252/299.62
3430482  5/1985  Fed. Rep. of Germany ....................... 252/299.01

OTHER PUBLICATIONS

Chandrasekhar, S., Mol. Cryst. Liq. Cryst., vol. 63, pp. 171-180 (1981).
Destrade, C., et al., Mol. Cryst. Liq. Cryst., vol. 71, pp. 111-135 (1981).
Kohne, B., et al., Chem. Zeitung, vol. 108 (12), pp. 408-410 and No. 3, p. 113 (1984).
LeBarny, P., et al., Liq. Cryst. Ordered Fluids, vol. 4, pp. 57-74 (1984).
Destrade, C., et al., J. de Physique, col. C3, suppl. No. 4, tome 40, pp. C3-3-17-C3-21 (Apr. 1979).
Dubois, J. C., et al., Liq. Cryst. Ordered Fluids, vol. 4, pp. 1043-1060 (1984).

Primary Examiner—Teddy S. Gron
Attorney, Agent, or Firm—Millen & White

[57] ABSTRACT

Triphenylene derivatives of the formula I

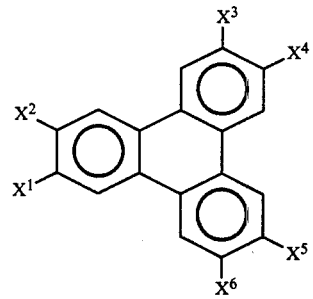

wherein $X^1$ to $X^6$ are each, independently of one another, —SH, —SR, —SOR, —SO$_2$R or —S—COR, and each R is an alkyl group with up to 20 C atoms, it being possible for one or two CH$_2$ groups to be replaced by O atoms and/or by unsubstituted or substituted vinylene or vinylidene groups, may be used as components of discotic liquid-crystalline phases.

19 Claims, No Drawings

TRIPHENYLENE DERIVATIVES

BACKGROUND OF THE INVENTION

Hexaalkanoyloxytriphenylenes are known (cf. C. Destrade, M. C. Mondon and I. Malthete, Journal of Physique, Colloquium C3, supplement to No. 4, Volume 40, April 1979, pages C3-17 and literature cited there).

SUMMARY OF THE INVENTION

It is an object of this invention to provide novel stable liquid-crystalline or mesogenic compounds which are suitable for use as components of discotic liquid-crystalline phases.

Upon further study of the specification and appended claims, further objects and advantages of this invention will become apparent to those skilled in the art.

These objects have been achieved by providing triphenylene compounds of formula I

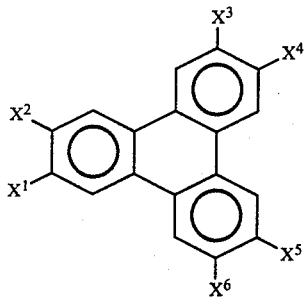

I wherein $X^1$ to $X^6$ are each, independently of one another, —SH, —SR, —SOR, —SO$_2$R or —S—COR, and each R independently is an alkyl group of up to 20 C atoms, it being possible for one or two CH$_2$ groups, in total, to be replaced by O atoms and/or by unsubstituted or substituted vinylene or vinylidene groups, the total of C-atoms being up to 20 in the latter case, and O atoms being non-adjacent. When the terminal CH$_2$ group is replaced by oxa, the resultant alkyl group is ω-OH substituted.

The triphenylene derivatives of the formula I can be used, like similar compounds, as components of discotic liquid-crystalline phases, especially for displays which are based on the guest-host effect, the effect of deformation of aligned phases, the dynamic scattering effect or a change in elliptization of the light.

It has been found that the triphenylene derivatives of the formula I are outstandingly suitable for use as components of discotic liquid-crystalline phases. In particular, it is possible to prepare, with their aid, stable discotic liquid-crystalline phases having a broad temperature range of the mesophase, the range being advantageously located for electro-optical effects.

The compounds of the formula I are moreover suitable for use as an anisotropic discotic matrix for spectroscopic investigations as described in, for example, R. Price, C. Schumann, Mol. Cryst. Liq. Cryst. 16 (1972) 291.

DETAILED DESCRIPTION

Further details of compounds having discotic properties, and of their use, are given in, for example, U.S. Pat. No. 4,333,709.

Surprisingly, the triphenylene derivatives of the formula I have proved to be discotic liquid-crystalline compounds having, in some cases, broad meso-ranges.

Moreover, the provision of the triphenylene derivatives of the formula I quite generally broadens substantially the range of discotic liquid-crystalline substances which are suitable, from various technological points of view, for the preparation of discotic mixtures.

The triphenylene derivatives of the formula I, in particular, for example, the thiols of the formula I, wherein at least one of the radicals $X^1$ to $X^6$ is —SH, and the thioethers of the formula I, wherein at least one of the radicals $X^1$ to $X^6$ is —SR, are moreover suitable as intermediates for the preparation of other substances, in particular, for example, the corresponding sulfoxides and/or sulfones and/or thioesters of the formula I, which can be used as constituents of liquid-crystalline discotic phases.

In the pure state, the triphenylene derivatives of the formula I range from virtually colorless to pale yellow and form liquid-crystalline mesophases in a temperature range which is advantageous for electro-optical use. They are very stable to chemicals, heat and light.

Accordingly, the present invention relates to the triphenylene derivatives of the formula I and to a process for their preparation, characterized in that, for the preparation of mercapto compounds, wherein at least one of the radicals $X^1$ to $X^6$ is SH, corresponding halogenotriphenylene compounds are reacted with a thiol of the formula R'—SH, R' being linear or branched alkyl with 1-5 C atoms, or with one of its salts, and the reaction product is reduced to the corresponding thiolate or mercapto compound, and/or that, for the preparation of thioethers of the formula I, wherein at least one of the radicals $X^1$ to $X^6$ is —SR, a corresponding halogen compound is reacted with a corresponding thiol or one of its salts, and/or that, for the preparation of sulfoxides of the formula I, wherein at least one of the radicals $X^1$ to $X^6$ is —SOR, a corresponding thioether is oxidized and/or that, for the preparation of sulfones of the formula I, wherein at least one of the radicals $X^1$ to $X^6$ is —SO$_2$R, a corresponding thioether or a corresponding sulfoxide is oxidized, and/or that, for the preparation of S-acyl compounds, wherein at least one of the radicals $X^1$ to $X^6$ is —S—COR, the corresponding thiolate or mercapto compound is acylated, or that the corresponding halogenotriphenylene compounds are reacted directly with thiocarboxylic acids of the formula R—COSH or one of their salts.

The invention further relates to the use of the triphenylene derivatives of the formula I as components of discotic liquid-crystalline phases.

Moreover, the invention relates to discotic liquid-crystalline phases containing at least one triphenylene derivative of the formula I, and to liquid crystal display elements which contain such phases.

In the preceding and following text, $X^1$ to $X^6$ and R have the meaning given, unless explicitly stated otherwise.

Preferred triphenylene derivatives of the formula I are those in which the radicals $X^1$ to $X^6$ are identical. Further preferred triphenylene derivatives of the formula I are those in which one or two, especially one, of the radicals $X^1$ to $X^6$ contains an alkyl group with 3 to 20 C atoms, in which alkyl group one or two CH$_2$ groups are replaced by O atoms and/or unsubstituted or substituted vinylene or vinylidene groups, the reactivity of which can be of advantage.

Particularly preferred groups of this type are ω-hydroxy-alkyl, (ω-1)-alkenyl, (ω-2)-alkenyl, (ω-3)-alkenyl and (ω-1)-methyl-(ω-1)-alkenyl, especially ω-hydroxyalkyl and (ω-1)-alkenyl, these groups being unsubstituted or monosubstituted or polysubstituted (e.g., 2–3 substituents) by F, Cl and/or CN.

Triphenylene derivatives of the formula I which have one or more asymmetric C atoms can be present in the racemic or optically active form, both forms being encompassed by formula I. Preferably, the triphenylene derivatives of the formula I do not possess more than one asymmetric C atom.

R is an alkyl radical in which it is also possible for one or two $CH_2$ groups to be replaced by oxygen atoms (giving, for example, an oxaalkyl or dioxaalkyl radical respectively) and/or by unsubstituted or substituted vinylene or vinylidene groups. These radicals can be linear or branched. Preferably, they are linear, have 3, 4, 5, 6, 7, 8, 9, 10, 11, 12, 13, 14, 15, 16, 17 or 18 C atoms and are accordingly preferably propyl, butyl, pentyl, hexyl, heptyl, octyl, nonyl, decyl, undecyl, dodecyl, tridecyl, tetradecyl, pentadecyl, hexadecyl, heptadecyl, octadecyl, 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl, 2-, 3-, 4-, 5-, 6-, 7-, 8-, 9- or 10-oxaundecyl, 2-, 3-, 4-, 5-, 6-, 7-, 8-, 9-, 10- or 11-oxadodecyl, 2-, 3-, 4-, 5-, 6-, 7-, 8-, 9-, 10-, 11- or 12-oxatridecyl, 2-, 3-, 4-, 5-, 6-, 7-, 8-, 9-, 10-, 11-, 12- or 13-oxatetradecyl, 2-, 3-, 4-, 5-, 6-, 7-, 8-, 9-, 10-, 11-, 12-, 13- or 14-oxapentadecyl, 2-, 3-, 4-, 5-, 6-, 7-, 8-, 9-, 10-, 11-, 12-, 13-, 14- or 15-oxahexadecyl, 2-, 3-, 4-, 5-, 6-, 7-, 8-, 9-, 10-, 11-, 12-, 13-, 14-, 15- or 16-oxaheptadecyl, 2-, 3-, 4-, 5-, 6-, 7-, 8-, 9-, 10-, 11-, 12-, 13-, 14-, 15-, 16- or 17-oxaoctadecyl, 2-hydroxyethyl, allyl, isobutenyl, 3-hydroxypropyl, 3-butenyl, 4-hydroxybutenyl, 4-pentenyl, 3-methyl-3-butenyl, 5-hydroxypentyl, 6-hydroxyhexyl, 7-hydroxyheptyl, 8-hydroxyoctyl, 9-hydroxynonyl, 10-hydroxydecyl, 11-hydroxyundecyl, 12-hydroxydodecyl, 13-hydroxytridecyl, 14-hydroxy-tetradecyl, 15-hydroxypentadecyl, 16-hydroxyhexadecyl, 17-hydroxyheptadecyl, 5-hexenyl, 6-heptenyl, 7-octenyl, 8-nonenyl, 9-decenyl, 10-undecenyl, 11-dodecenyl, 12-tridecenyl, 13-tetradecenyl, 14-pentadecenyl, 15-hexadecenyl, 16-heptadecenyl, 17-octadecenyl, 4-methyl-4-pentenyl, 6-methyl-6-heptenyl, 8-methyl-8-nonenyl, 10-methyl-10-unde-cenyl, 12-methyl-12-tridecenyl, 14-methyl-14-pentadecenyl, 16-methyl-16-heptadecenyl, also methyl, ethyl, hydroxymethyl, nonadecyl, eicosyl, 2,4-dioxapentyl, 2,4-, 2,5-or 3,5-dioxahexyl, 2,4-, 2,5-, 2,6-, 3,5-, 3,6- or 4,6-dioxaheptyl, 2-, 3-, 4-, 5-, 6-, 7-, 8-, 9-, 10-, 11-, 12-, 13-, 14-, 15-, 16-, 17- or 18-oxanonadecyl, 2-, 3-, 4-, 5-, 6-, 7-, 8-, 9-, 10-, 11-, 12-, 13-, 14-, 15-, 16-, 17-, 18- or 19-oxaeicosyl, 18-hydroxyoctadecyl, 19-hydroxynonadecyl, 18-nonadecenyl, 19-eicosenyl, 18-methyl-18-nonadecenyl, 16-hydroxy-3-oxahexadecyl, 15-fluoro-15-hexadecenyl, 15-chloro-15-hexadeoenyl and 15-cyano-15-hexadecenyl.

Those S-acyl-triphenylene derivatives are particularly preferred in which R is straight-chain alkyl with 2–10 C atoms.

Compounds of the formula I having branched groups R can occasionally be of importance because of better solubility in the conventional discotic liquid-crystalline base materials, but in particular as chiral doping agents if they are optically active. Branched groups of this type as a rule contain not more than one chain branching. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-oxa-3-methylbutyl and 3-oxa-4-methylpentyl.

Among the triphenylene derivatives of the formula I, preferred compounds are those in which the radical R has one of the preferred meanings mentioned.

The triphenylene derivatives of the formula I are prepared by methods known per se, as described in the literature (for example in the standard works such as Houben-Weyl, Methoden der Organischen Chemie, Georg-Thieme-Verlag, Stuttgart), and in particular under reaction conditions which are known, and suitable, for the reactions mentioned. It is also possible to make use of variants which are known per se but are not mentioned in more detail here.

The starting materials are either known or can without difficulty be prepared in analogy to known compounds, using methods known per se. They can, if desired, also be formed in situ, in the sense that they are not isolated from the reaction mixture but instead are immediately reacted further to give the compounds of the formula I.

Thioethers of the formula I, wherein at least one of the radicals $X^1$ to $X^6$ is —SR, can be prepared by reacting a corresponding halogen compound, preferably a bromine or chlorine compound, with an appropriate thiol of the formula R—SH or—preferably—one of its salts, in particular the corresponding Na thiolate of the formula R—SNa. Appropriate halogeno-triphenylenes are either known (for example Chemiker Zeitung 1984, 108, page 113) or can without difficulty be prepared in analogy to known compounds, using methods known per se, and in situ if appropriate.

This reaction can be carried out in the presence or absence of an inert solvent, in particular at temperatures between about −20° and 250°, preferably between 10 and 150°. Examples of suitable solvents are hydrocarbons, such as benzene, toluene, xylenes or mesitylene; tertiary bases, such as triethylamine, pyridine or picoline; alcohols, such as methanol, ethanol or butanol; glycols and glycol ethers, such as ethylene glycol, diethylene glycol and 2-methoxyethanol; ketones, such as acetone; ethers, such as tetrahydrofuran or dioxane; amides, such as dimethylformamide (DMF), 1,3-dimethyl-2-imidazolidinone (DMEU) or hexamethylphosphotriamide (HMPT); and sulfoxides, such as dimethyl sulfoxide. Mixtures of these solvents are also suitable.

The thioethers obtained, of the formula I ($X^1$ to $X^6$ are —SR), preferably hexakis-(isopropylthio)-triphenylene, which is preferably obtained by reacting the corresponding hexahalogeno-triphenylene with sodium isopropylthiolate in 1,3-dimethyl-2-imidazoline (DMEU) under nitrogen at temperatures between 70° and 130° C., can be reduced, in the manner known per se for ordinary sulfides, by eliminating the alkyl group and subjecting the triphenylene-hexathiolate obtainable to further reaction, preferably in a one-pot reaction. The reduction is carried out with metals, preferably alkali metals, in particular sodium.

The reaction conditions essentially correspond to those known and described for reductions with metals (for example in Houben-Weyl, volume IV/Ic). The reaction is preferably carried out in polar, aprotic solvents, such as dimethylacetamide, diethylacetamide, dimethylformamide, dimethyl sulfoxide, methylamine, diethylamine or butylamine, ammonia or phosphoric acid amides, such as in particular hexamethylphosphotriamide (HMPT).

The triphenylene-thiolates thus obtained, preferably sodium thiolates, can then be reacted directly to give the various end products. Acidification gives the thiol derivatives (mercapto-triphenylenes) which themselves are important intermediates. Thus, for example, reaction with alkyl halides (R—Hal), alkyl tosylates or dialkyl sulfates gives the corresponding thioethers (—SR) which, however, can also be obtained directly from the thiolates. This last reaction route can be followed if a direct reaction of halogeno-triphenylene derivatives with appropriate thiols (R—SH) is not possible due to the latter not being readily accessible.

Sulfoxides and sulfones of the formula I, wherein at least one of the radicals $X^1$ to $X^6$ is —SOR or —SO$_2$R, can be prepared by oxidation of corresponding thioethers of the formula I, wherein at least one of the radicals $X^1$ to $X^6$ is —SR.

Depending on the chosen reagent and the conditions employed, the thioethers are oxidized to the corresponding sulfoxides (at least one of the groups $X^1$ to $X^6$ being SO) or to the corresponding sulfones (at least one of the groups $X^1$ to $X^6$ being SO$_2$), employing methods known per se from the literature, the details of the reaction conditions being easily found from the literature. If it is desired to obtain the sulfoxides, oxidation is carried out with, for example, hydrogen peroxide, peracids, Cr(VI) compounds, such as chromic acid, nitric acid, nitrous gases, N$_2$O$_3$, halogens, such as chlorine, hypochlorites, KMnO$_4$, N-bromosuccinimide, 1-chlorobenzotriazole, Ce(IV) compounds, such as (NH$_4$)$_2$Ce(NO$_3$)$_6$, or negatively substituted aromatic diazonium salts such as o- or p-nitrophenyldiazonium chloride, or by electrolytic means, under relatively mild conditions and at relatively low temperatures (about −80° to +100°). If, on the other hand, it is desired to obtain the sulfones, the same oxidizing agents are used under more vigorous conditions and/or in excess, and as a rule at higher temperatures. In these reactions, the conventional inert solvents may be added or be absent. Examples of suitable inert solvents are water, aqueous mineral acids, aqueous alkali metal hydroxide solutions, lower alcohols such as methanol or ethanol, esters such as ethyl acetate, ketones such as acetone, lower carboxylic acids such as acetic acid, nitriles such as acetonitrile, hydrocarbons such as benzene and chlorinated hydrocarbons such as chloroform or CCl$_4$.

A preferred oxidizing agent is 30% aqueous hydrogen peroxide. If this is used in the calculated amount in solvents such as acetic acid, acetone, ethanol or aqueous sodium hydroxide solution, at temperatures between −20° and 100°, it leads to the sulfoxides, while when used in excess at higher temperatures, preferably in acetic acid or in a mixture of acetic acid and acetic anhydride, it leads to the sulfones.

A further preferred oxidizing agent is 3-chloroperbenzoic acid. This, when used in the calculated amount in solvents such as halohydrocarbons at temperatures below 10°, as a rule leads to the sulfoxides, while when used in excess at temperatures between 0° and 150°, preferably between room temperature and 100°, it leads to the sulfones.

A further possible method of preparing the sulfoxides is to treat the thioethers with chlorine, for example in moist benzene or in acetic acid. The dichloro compounds obtained as intermediates are very easily converted to the sulfoxides by hydrolysis.

Reaction of the triphenylene-thiolates or -thiols, which do not have to be isolated as such, with acylating agents, for example carboxylic acid anhydrides or carboxylic acid halides, preferably acid halides, in particular acid chlorides of the formula R—COCl, finally gives the S-acylated triphenylenes. The reaction conditions for acidification or acylation are known from the literature, or they can readily be transferred to the substances according to the invention, in analogy to the preparation of similar compounds.

The acylation, starting from the corresponding thiolate, is preferably carried out in the same solvent which was used for the reduction. The acylating agent is preferably added while cooling with ice and adding a base, in particular pyridine, in order to neutralize the acid being formed. If the acylation is carried out at the stage of the (isolated) mercapto compound, other solvents, for example trifluoroacetic acid, are also suitable. After the addition of the acylating agent, the acylation is preferably carried out for several hours at temperatures between 0° and 70° C.

The S-acyl-triphenylene derivatives can also be prepared directly by reacting the corresponding halogeno-triphenylenes with thiocarboxylic acids or one of their salts, by methods known per se in analogy to the preparation of similar compounds.

Thioethers which have terminal hydroxyl groups and are suitable for the introduction of further functional groups can also be prepared by hydroboration of the thioethers with a terminal double bond and oxidation of the intermediate organoborane. Processes of this type have been described, for example, in H. C. Brown: Hydroboration, published by Benjamin, New York.

The discotic liquid-crystalline phases according to the invention comprise 2 to 15, preferably 3 to 12, components, including at least one compound of the formula I. The other constituents are preferably chosen from the known discotic liquid-crystalline substances, especially from the classes of the hexasubstituted benzene, cyclohexane or triphenylene derivatives. The phases according to the invention contain about 0.1 to 99%, preferably 10 to 95%, of one or more compounds of the formula I. The phases according to the invention can, however, also comprise exclusively at least two, preferably 3 to 12, compounds of the formula I.

The discotic liquid-crystalline phases according to the invention are prepared in a conventional manner. As a rule, the components are dissolved in one another, advantageously at an elevated temperature.

The discotic liquid-crystalline phases according to the invention can further be modified by suitable additives. For example, conductive salts for improving the conductivity, pleochroic dyestuffs or substances for modifying the dielectric anisotropy, the viscosity and/or the orientation of the discotic phases may be added.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the examples, M.p. is the melting point and C.p. is the clear point of a liquid crystal substance.

"Conventional working-up" means: water is added, the mixture is extracted with methylene chloride, the organic phase is separated off, dried and evaporated, and the product is purified by crystallization and/or chromatography. C=crystalline-solid state; D=discotic modification; I=isotropic liquid state. The phase transition temperatures were determined under a polarization microscope (Mettler FP 2 heated microscope stage).

EXAMPLE 1

2,3,6,7,10,11-Hexakis-mercapto-triphenylene (a) 2,3,6,7,10,11-Hexakis-(isopropylthio)-triphenylene A mixture of 7.0 g (10 mmol) of 2,3,6,7,10,11-hexabromotriphenylene, 14.7 g (150 mmol) of sodium isopropylthiolate and 150 ml of 1,3-dimethyl-2-imidazoline (DMEU) is stirred under nitrogen for one hour at 100° C. When the reaction mixture has cooled, it is poured into water and extracted several times with ether. The combined ether phases are dried several times with magnesium sulfate, filtered and evaporated in vacuo. The crude product is recrystallized twice from ethyl acetate. M.p.: 165°–168° C.

(b) Sodium 2,3,6,7,10,11-hexakis-triphenylene-thiolate 0.48 g (21 mg atom) of sodium cut into small pieces is introduced, at 100° C. and with stirring and under an $N_2$ atmosphere, into a solution of 0.67 g (1 mmol) of 2,3,6,7,10,11-hexakis-(isopropylthio)-triphenylene in 10 ml of N,N-dimethylacetamide, and the mixture is stirred for a further 15 hours at 100° C. The solution contains sodium 2,3,6,7,10,11-hexakis-triphenylene-thiolate, which is not isolated as such.

(c) 2,3,6,7,10,11-Hexakis-mercapto-triphenylene

The solution obtained in (b) is cooled to the temperature of ice, and 0.1 N HCl is added dropwise under an $N_2$ atmosphere, whereupon the particular mercapto compound separates out as a yellowish precipitate. Dilute hydrochloric acid is added until no further precipitate separates out. The precipitate is filtered off, washed several times with solvent and dried over $MgSO_4$ under $N_2$.

EXAMPLE 2

2,3,6,7,10,11-Hexakis-(pentylthio)-triphenylene

A mixture of 1.75 g of 2,3,6,7,10,11-hexabromotriphenylene (described in: R. Breslow et al., Tetrahedron 38, 863 (1982)), 3.8 g of sodium pentylthiolate and 110 ml of DMEU is stirred for 2 hours at 100° under $N_2$, worked up in the usual manner and recrystallized from acetone/petroleum ether, to give 2,3,6,7,10,11-hexakis-(pentylthio)-triphenylene, C/I 94.5°; I/D (92.2°).

The following are prepared analogously:
2,3,6,7,10,11-hexakis-(methylthio)-triphenylene
2,3,6,7,10,11-hexakis-(ethylthio)-triphenylene
2,3,6,7,10,11-hexakis-(propylthio)-triphenylene
2,3,6,7,10,11-hexakis-(butylthio)-triphenylene
2,3,6,7,10,11-hexakis-(hexylthio)-triphenylene, C/D 62°; D/I 93.5°
2,3,6,7,10,11-hexakis-(heptylthio)-triphenylene, C/D 73°; D/I 94°
2,3,6,7,10,11-hexakis-(octylthio)-triphenylene, C/D 54.5°; D/I 87°
2,3,6,7,10,11-hexakis-(nonylthio)-triphenylene, C/D 59°; D/I 81.5° and
2,3,6,7,10,11-hexakis-(decylthio)-triphenylene, C/D 64°; D/I 71°.

EXAMPLE 3

2,3,6,7,10,11-Hexakis-(undecylthio)-triphenylene

A mixture of 1.75 g of 2,3,6,7,10,11-hexabromotriphenylene, 6.3 g of sodium undecylthiolate and 120 ml of DMEU is stirred for 2 hours at 100° under $N_2$, worked up in the usual manner and recrystallised from ethanol and/or methylene chloride/petroleum ether, giving 2,3,6,7,10,11-hexakis-(undecylthio)-triphenylene, C/I 71°; I/D (67°).

The following are prepared analogously:
2,3,6,7,10,11-hexakis-(dodecylthio)-triphenylene, C/I 80°; I/D 62°
2,3,6,7,10,11-hexakis-(tridecylthio)-triphenylene
2,3,6,7,10,11-hexakis-(tetradecylthio)-triphenylene
2,3,6,7,10,11-hexakis-(pentadecylthio)-triphenylene
2,3,6,7,10,11-hexakis-(hexadecylthio)-triphenylene, m.p. 91.4°
2,3,6,7,10,11-hexakis-(heptadecylthio)-triphenylene
2,3,6,7,10,11-hexakis-(octadecylthio)-triphenylene
2,3,6,7,10,11-hexakis-(nonadecylthio)-triphenylene and
2,3,6,7,10,11-hexakis-(eicosylthio)-triphenylene.

EXAMPLE 4

2,3,6,7,10,11-Hexakis-(heptylsulfonyl)-triphenylene 0.28 g of 2,3,6,7,10,11-hexakis-(heptylthio)-triphenylene and 1.0 g of 85% m-chloroperbenzoic acid in 30 ml of $CHCl_3$ are boiled for 15 hours, the mixture is evaporated and the residue is recrystallised from methylene chloride/ethanol, giving 2,3,6,7,10,11-hexakis-(heptylsulfonyl)-triphenylene, m.p. 256°–257.7°.

The following are prepared analogously:
2,3,6,7,10,11-hexakis-(methylsulfonyl)-triphenylene
2,3,6,7,10,11-hexakis-(ethylsulfonyl)-triphenylene
2,3,6,7,10,11-hexakis-(propylsulfonyl)-triphenylene
2,3,6,7,10,11-hexakis-(butylsulfonyl)-triphenylene
2,3,6,7,10,11-hexakis-(pentylsulfonyl)-triphenylene
2,3,6,7,10,11-hexakis-(hexylsulfonyl)-triphenylene
2,3,6,7,10,11-hexakis-(octylsulfonyl)-triphenylene
2,3,6,7,10,11-hexakis-(nonylsulfonyl)-triphenylene
2,3,6,7,10,11-hexakis-(decylsulfonyl)-triphenylene, m.p. 202°
2,3,6,7,10,11-hexakis-(undecylsulfonyl)-triphenylene
2,3,6,7,10,11-hexakis-(dodecylsulfonyl)-triphenylene, m.p. 179.0°–179.7°
2,3,6,7,10,11-hexakis-(tridecylsulfonyl)-triphenylene
2,3,6,7,10,11-hexakis-(tetradecylsulfonyl)-triphenylene
2,3,6,7,10,11-hexakis-(pentadecylsulfonyl)-triphenylene
2,3,6,7,10,11-hexakis-(hexadecylsulfonyl)-triphenylene, m.p. 131.1°–133°
2,3,6,7,10,11-hexakis-(heptadecylsulfonyl)-triphenylene
2,3,6,7,10,11-hexakis-(octadecylsulfonyl)-triphenylene
2,3,6,7,10,11-hexakis-(nonadecylsulfonyl)-triphenylene and
2,3,6,7,10,11-hexakis-(eicosylsulfonyl)-triphenylene.

EXAMPLE 5

2,3,6,7,10,11-Hexakis-(nonylsulfinyl)-triphenylene

A solution of 0.7 ml of 30% $H_2O_2$ in 50 ml of acetic acid is added dropwise in the course of 30 minutes, with stirring, to a solution of 1.18 g of 2,3,6,7,10,11-hexakis-(nonylthio)-triphenylene in 600 ml of acetic acid at 75°–80°. The mixture is kept at 80° for 2 hours and is then boiled up and poured into water, the batch is worked up in the usual manner and 2,3,6,7,10,11-hexakis-(nonylsulfinyl)-triphenylene is obtained.

The following are prepared analogously:
2,3,6,7,10,11-hexakis-(methylsulfinyl)-triphenylene
2,3,6,7,10,11-hexakis-(ethylsulfinyl)-triphenylene
2,3,6,7,10,11-hexakis-(propylsulfinyl)-triphenylene
2,3,6,7,10,11-hexakis-(butylsulfinyl)-triphenylene
2,3,6,7,10,11-hexakis-(pentylsulfinyl)-triphenylene
2,3,6,7,10,11-hexakis-(hexylsulfinyl)-triphenylene
2,3,6,7,10,11-hexakis-(heptylsulfinyl)-triphenylene
2,3,6,7,10,11-hexakis-(octylsulfinyl)-triphenylene
2,3,6,7,10,11-hexakis-(decylsulfinyl)-triphenylene
2,3,6,7,10,11-hexakis-(undecylsulfinyl)-triphenylene
2,3,6,7,10,11-hexakis-(dodecylsulfinyl)-triphenylene
2,3,6,7,10,11-hexakis-(tridecylsulfinyl)-triphenylene
2,3,6,7,10,11-hexakis-(tetradecylsulfinyl)-triphenylene
2,3,6,7,10,11-hexakis-(pentadecylsulfinyl)-triphenylene
2,3,6,7,10,11-hexakis-(hexadecylsulfinyl)-triphenylene
2,3,6,7,10,11-hexakis-(heptadecylsulfinyl)-triphenylene
2,3,6,7,10,11-hexakis-(octadecylsulfinyl)-triphenylene
2,3,6,7,10,11-hexakis-(nonadecylsulfinyl)-triphenylene and
2,3,6,7,10,11-hexakis-(eicosylsulfinyl)-triphenylene.

EXAMPLE 6

2,3,6,7,10-Pentakis-(hexylthio)-11-(5-hydroxypentylthio)-triphenylene

A mixture of 0.9 g of 2,3,6,7,10-pentakis-(hexylthio)-11-bromotriphenylene (obtainable from 2,3,6,7,10,11-hexabromotriphenylene by reaction with a slightly less than equivalent amount of sodium hexylthiolate), 160 mg of sodium (5-propionyloxypentyl)-thiolate and 100 ml of DMEU is stirred for 2 hours at 100° under $N_2$, worked up in the usual manner and subjected to alkaline hydrolysis, giving 2,3,6,7,10-pentakis-(hexylthio)-11-(5-hydroxypentylthio)-triphenylene.

The following are prepared analogously:
2,3,6,7,10-pentakis-(hexylthio)-11-(6-hydroxyhexylthio)-triphenylene
2,3,6,7,10-pentakis-(hexylthio)-11-(7-hydroxyheptylthio)-triphenylene
2,3,6,7,10-pentakis-(hexylthio)-11-(8-hydroxyoctylthio)-triphenylene
2,3,6,7,10-pentakis-(hexylthio)-11-(9-hydroxynonylthio)-triphenylene
2,3,6,7,10-pentakis-(hexylthio)-11-(10-hydroxydecylthio)-triphenylene
2,3,6,7,10-pentakis-(hexylthio)-11-(11-hydroxyundecylthio)-triphenylene
2,3,6,7,10-pentakis-(hexylthio)-11-(12-hydroxydodecylthio)-triphenylene
2,3,6,7,10-pentakis-(hexylthio)-11-(13-hydroxytridecylthio)-triphenylene
2,3,6,7,10-pentakis-(hexylthio)-11-(14-hydroxytetradecylthio)-triphenylene
2,3,6,7,10-pentakis-(hexylthio)-11-(15-hydroxypentadecylthio)-triphenylene
2,3,6,7,10-pentakis-(hexylthio)-11-(16-hydroxyhexadecylthio)-triphenylene
2,3,6,7,10-pentakis-(hexylthio)-11-(17-hydroxyheptadecylthio)-triphenylene
2,3,6,7,10-pentakis-(hexylthio)-11-(18-hydroxyoctadecylthio)-triphenylene
2,3,6,7,10-pentakis-(hexylthio)-11-(19-hydroxynonadecylthio)-triphenylene
2,3,6,7,10-pentakis-(hexylthio)-11-(5-hydroxypentylthio)-triphenylene
2,3,6,7,10-pentakis-(hexylthio)-11-(4-hydroxybutylthio)-triphenylene
2,3,6,7,10-pentakis-(hexylthio)-11-(3-hydroxypropylthio)-triphenylene
2,3,6,7,10-pentakis-(hexylthio)-11-(2-hydroxyethylthio)-triphenylene
2,3,6,7,10-pentakis-(hexylthio)-11-(hydroxymethylthio)-triphenylene
2,3,6,7,10-pentakis-(hexadecylthio)-11-(6-hydroxyhexylthio)-triphenylene
2,3,6,7,10-pentakis-(hexadecylthio)-11-(7-hydroxyheptylthio)-triphenylene
2,3,6,7,10-pentakis-(hexadecylthio)-11-(8-hydroxyoctylthio)-triphenylene
2,3,6,7,10-pentakis-(hexadecylthio)-11-(9-hydroxynonylthio)-triphenylene
2,3,6,7,10-pentakis-(hexadecylthio)-11-(10-hydroxydecylthio)-triphenylene
2,3,6,7,10-pentakis-(hexadecylthio)-11-(11-hydroxyundecylthio)-triphenylene
2,3,6,7,10-pentakis-(hexadecylthio)-11-(12-hydroxydodecylthio)-triphenylene
2,3,6,7,10-pentakis-(hexadecylthio)-11-(13-hydroxytridecylthio)-triphenylene
2,3,6,7,10-pentakis-(hexadecylthio)-11-(14-hydroxytetradecylthio)-triphenylene
2,3,6,7,10-pentakis-(hexadecylthio)-11-(15-hydroxypentadecylthio)-triphenylene
2,3,6,7,10-pentakis-(hexadecylthio)-11-(16-hydroxyhexadecylthio)-triphenylene
2,3,6,7,10-pentakis-(hexadecylthio)-11-(17-hydroxyheptadecylthio)-triphenylene
2,3,6,7,10-pentakis-(hexadecylthio)-11-(18-hydroxyoctadecylthio)-triphenylene
2,3,6,7,10-pentakis-(hexadecylthio)-11-(19-hydroxynonadecylthio)-triphenylene
2,3,6,7,10-pentakis-(hexadecylthio)-11-(5-hydroxypentylthio)-triphenylene
2,3,6,7,10-pentakis-(hexadecylthio)-11-(4-hydroxybutylthio)-triphenylene
2,3,6,7,10-pentakis-(hexadecylthio)-11-(3-hydroxypropylthio)-triphenylene
2,3,6,7,10-pentakis-(hexadecylthio)-11-(2-hydroxyethylthio)-triphenylene
2,3,6,7,10-pentakis-(hexadecylthio)-11-(hydroxymethylthio)-triphenylene
2,3,6,7,10-pentakis-(hexadecylthio)-11-(2-methylbutylthio)-triphenylene
2,3,6,7,10-pentakis-(hexadecylthio)-11-(2-methylpentylthio)-triphenylene and
2,3,6,7,10-pentakis-(hexadecylthio)-11-(2-methylhexylthio)-triphenylene.

EXAMPLE 7

2,3,6,7,10-Pentakis-(hexylthio)-11-(7-octenylthio)-triphenylene

A mixture of 400 mg of 2,3,6,7,10-pentakis-(hexylthio)-11-bromotriphenylene, 70 mg of sodium (7-octenyl)-thiolate and 60 ml of DMEU is stirred for 3 hours at 90° under $N_2$ and worked up in the usual manner, giving 2,3,6,7,10-pentakis-(hexylthio)-11-(7-octenylthio)-triphenylene.

The following are prepared analogously:

2,3,6,7,10-pentakis-(hexylthio)-11-(allylthio)-triphenylene
2,3,6,7,10-pentakis-(hexylthio)-11-(isobutenylthio)-triphenylene
2,3,6,7,10-pentakis-(hexylthio)-11-(4-pentenylthio)-triphenylene
2,3,6,7,10-pentakis-(hexylthio)-11-(7-octenylthio)-triphenylene
2,3,6,7,10-pentakis-(hexylthio)-11-(8-nonenylthio)-triphenylene
2,3,6,7,10-pentakis-(hexylthio)-11-(9-decenylthio)-triphenylene
2,3,6,7,10-pentakis-(hexylthio)-11-(10-undecenylthio)-triphenylene
2,3,6,7,10-pentakis-(hexylthio)-11-(11-dodecenylthio)-triphenylene
2,3,6,7,10-pentakis-(hexylthio)-11-(14-pentadecenylthio)-triphenylene
2,3,6,7,10-pentakis-(hexylthio)-11-(16-heptadecenylthio)-triphenylene
2,3,6,7,10-pentakis-(hexylthio)-11-(4-methyl-4-pentenylthio)-triphenylene
2,3,6,7,10-pentakis-(hexylthio)-11-(6-methyl-6-heptenylthio)-triphenylene
2,3,6,7,10-pentakis-(hexylthio)-11-(15-fluoro-15-hexadecenylthio)-triphenylene
2,3,6,7,10-pentakis-(hexylthio)-11-(15-chloro-15-hexadecenylthio)-triphenylene
2,3,6,7,10-pentakis-(octylthio)-11-(allylthio)-triphenylene
2,3,6,7,10-pentakis-(octylthio)-11-(isobutenylthio)-triphenylene
2,3,6,7,10-pentakis-(octylthio)-11-(4-pentenylthio)-triphenylene
2,3,6,7,10-pentakis-(octylthio)-11-(7-octenylthio)-triphenylene
2,3,6,7,10-pentakis-(octylthio)-11-(8-nonenylthio)-triphenylene
2,3,6,7,10-pentakis-(octylthio)-11-(9-decenylthio)-triphenylene
2,3,6,7,10-pentakis-(octylthio)-11-(10-undecenylthio)-triphenylene
2,3,6,7,10-pentakis-(octylthio)-11-(11-dodecenylthio)-triphenylene
2,3,6,7,10-pentakis-(octylthio)-11-(14-pentadecenylthio)-triphenylene
2,3,6,7,10-pentakis-(octylthio)-11-(16-heptadecenylthio)-triphenylene
2,3,6,7,10-pentakis-(octylthio)-11-(4-methyl-4-pentenylthio)-triphenylene
2,3,6,7,10-pentakis-(octylthio)-11-(6-methyl-6-heptenylthio)-triphenylene
2,3,6,7,10-pentakis-(octylthio)-11-(15-fluoro-15-hexadecenylthio)-triphenylene and
2,3,6,7,10-pentakis-(octylthio)-11-(15-chloro-15-hexadecenylthio)-triphenylene.

EXAMPLE 8

2,3,6,7,10,11-Hexakis-(pentanoylthio)-triphenylene

The solution obtained in 1 (b) is cooled to 0° C., 2 ml of pyridine are added and 24 mmol of pentanoic acid chloride are added dropwise under nitrogen, and the mixture is stirred for 5 hours at 50° C.

After cooling to room temperature, the solution is poured onto water and extracted several times with ether. The combined organic phases are washed several times with water and saturated sodium chloride solution, dried over magnesium sulfate, filtered and evaporated in vacuo. The crude product is purified by chromatography (over silica gel, solvent: ethyl acetate/petroleum ether) and recrystallisation.

EXAMPLES 9–11

The following are prepared analogously to Example 8:
(9) 2,3,6,7,10,11-hexakis-(octanoylthio)-triphenylene
(10) 2,3,6,7,10,11-hexakis-(nonanoylthio)-triphenylene
(11) 2,3,6,7,10,11-hexakis-(decanoylthio)-triphenylene.

EXAMPLE 12

2,3,6,7,10,11-Hexakis-(acetylthio)-triphenylene 2 mmol of 2,3,6,7,10,11-hexakis-mercapto-triphenylene, prepared according to Example 1, are dissolved in 50 ml of trifluoroacetic acid, 5 mmol of acetic anhydride are added with cooling and under a nitrogen atmosphere, and the mixture is stirred for 5 hours at 50° C. under $N_2$. Further working-up of the mixture is carried out as described in Example 8.

EXAMPLES 13–15

The following are prepared analogously to Example 12:
(13) 2,3,6,7,10,11-hexakis-(propionylthio)-triphenylene
(14) 2,3,6,7,10,11-hexakis-(butyrylthio)-triphenylene
(15) 2,3,6,7,10,11-hexakis-(hexanoylthio)-triphenylene The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A triphenylene of the formula

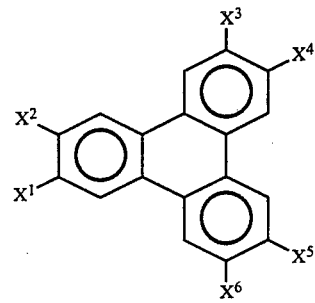

wherein $X^1$ to $X^6$ are each —SH, —SR, —SOR, —SO$_2$R or —S—COR, and each R is alkyl of up to 20 C atoms, or such an alkyl group wherein one or two CH$_2$ groups not bound to S are replaced by O atoms and/or vinylene or vinylidene groups or vinylene or vinylidene groups substituted by F, Cl or CN, the total number of C atoms being up to 20 in all cases, and O atoms being non-adjacent
  the X-substitution being hexakis and saturated, or pentakis and saturated with the sixth X being unsaturated.

2. A compound of claim 1 wherein $X^1$–$X^6$ are identical.

3. A compound of claim 1 wherein $X^1$–$X^6$ contains alkyl of 3–20 C atoms having one or two O atoms or vinylene or vinylidene groups.

4. A compound of claim 3 wherein $X^1$–$X^6$ contain a group which is ω-hydroxy-alkyl, (ω-1)-alkenyl, (ω-2)-alkenyl, (ω-3)-alkenyl or (ω-1)-methyl-(ω-1)-alkenyl.

5. A compound of claim 1 wherein R is linear.

6. A compound of claim 1 wherein at least one of $X^1$–$X^6$ is —SH.

7. A compound of claim 1 wherein at least one of $X^1$–$X^6$ is —SR.

8. A compound of claim 1 wherein at least one of $X^1$–$X^6$ is —SOR.

9. A compound of claim 1 wherein at least one of $X^1$–$X^6$ is —SO$_2$R.

10. A compound of claim 1 wherein at least one of $X^1$–$X^6$ is —S—COR.

11. A compound of claim 2 wherein the X's are —SH.

12. A compound of claim 2 wherein the X's are —SR.

13. A compound of claim 2 wherein the X's are —SOR.

14. A compound of claim 2 wherein the X's are —SO$_2$R.

15. A compound of claim 2 wherein the X's are —S—COR.

16. A discotic liquid-crystalline phase comprising at least two liquid-crystalline components, wherein at least one component is a triphenylene derivative of claim 1.

17. A discotic liquid-crystalline phase comprising at least two liquid-crystalline components, wherein at least one component is a triphenylene derivative of claim 2.

18. In a liquid crystal display element comprising a liquid-crystalline phase, the improvement wherein the phase is one of claim 16.

19. In a liquid crystal display element comprising a liquid-crystalline phase, the improvement wherein the phase is one of claim 17.

* * * * *